Oct. 31, 1933.　　　H. N. OTT　　　1,933,386
MICROSCOPE
Filed Sept. 14, 1931　　2 Sheets-Sheet 1
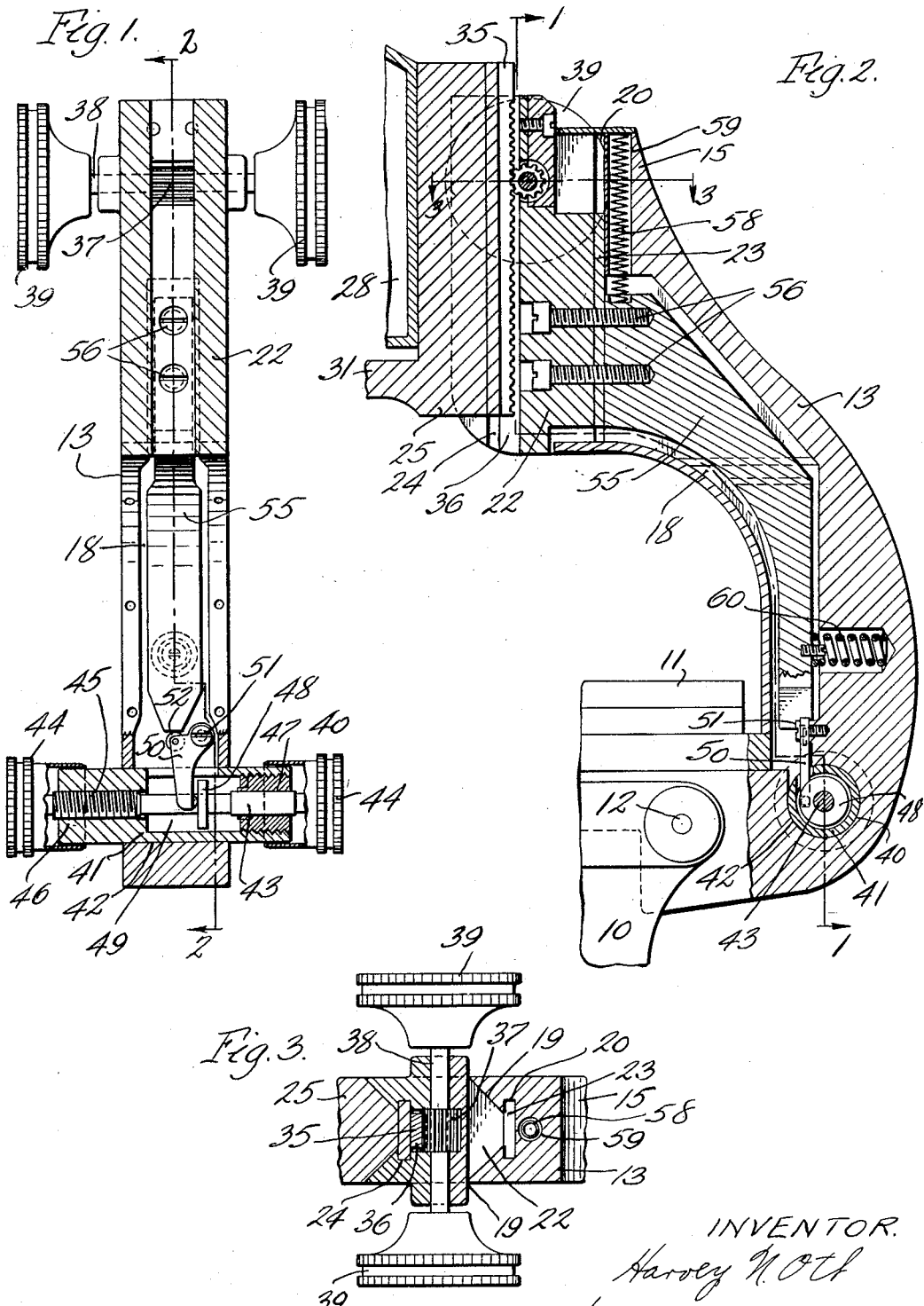
INVENTOR.
Harvey N. Ott
by Parker & Crochnow
ATTORNEYS.

Oct. 31, 1933.  H. N. OTT  1,933,386
MICROSCOPE
Filed Sept. 14, 1931   2 Sheets-Sheet 2
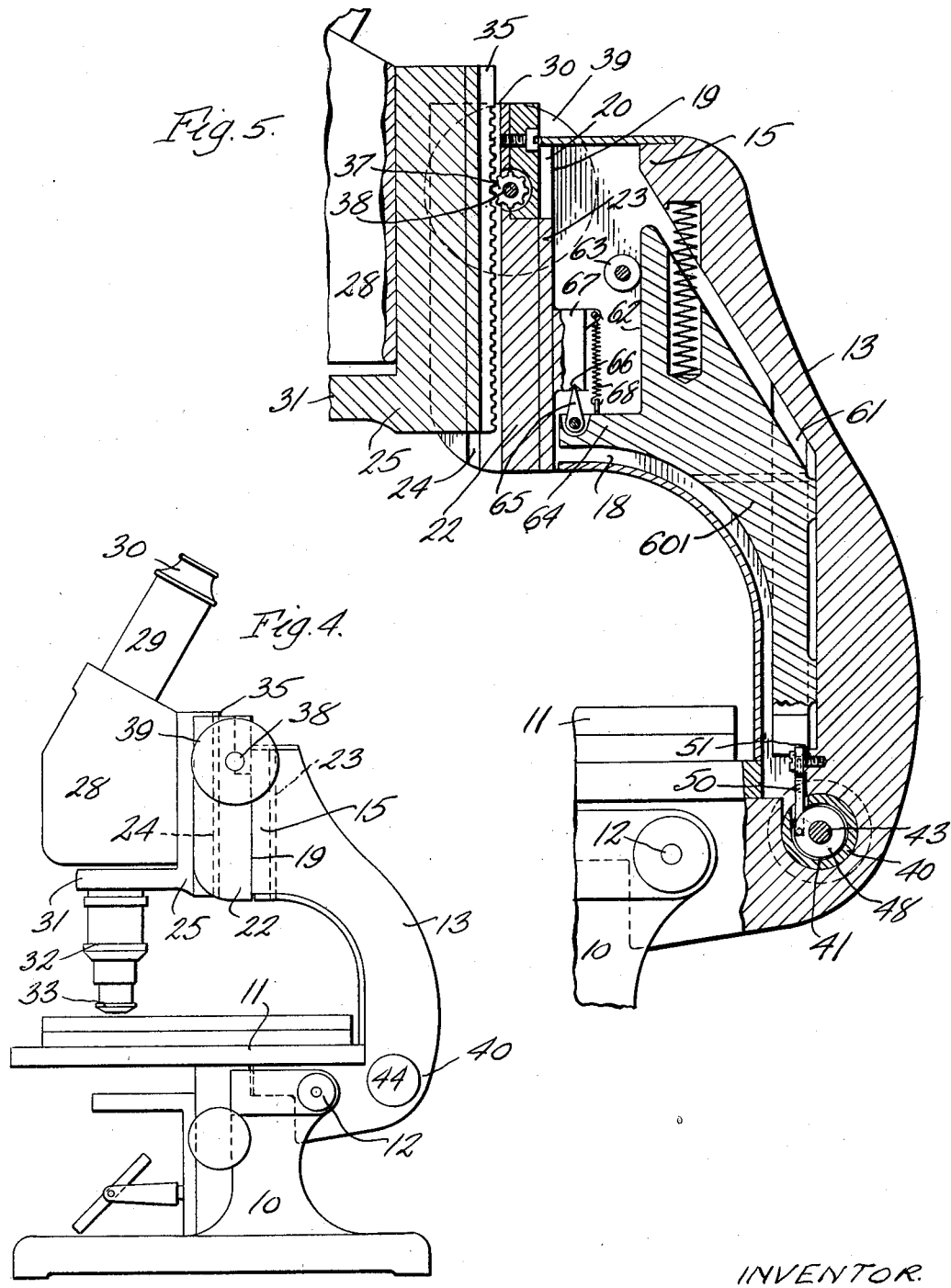
INVENTOR.
Harvey N. Ott
by Parker & Crochnow
ATTORNEYS Patented Oct. 31, 1933

1,933,386

UNITED STATES PATENT OFFICE 1,933,386

MICROSCOPE

Harvey N. Ott, Buffalo, N. Y., assignor to Spencer Lens Company, Buffalo, N. Y.

Application September 14, 1931
Serial No. 562,641

4 Claims. (Cl. 88—39)

This invention relates to improvements in microscopes.

In the usual types of microscopes, the operating knobs for the adjustment mechanisms, by which the optical system of the instrument is adjusted toward and from the object, are located on an upright arm or support and at a considerable distance above the base of the instrument. Under such conditions, the knobs cannot be steadily grasped and accurately manipulated since the user is not able to rest his hands firmly upon the support upon which the instrument rests.

The object of this invention is to construct a microscope in which the optical system may be actuated through the manipulation of the fine adjustment mechanism while the hands of the user rest and are steadied on the surface upon which the instrument is supported; also to construct a microscope having the aforementioned advantages which permit the use of several important standard parts of microscopes such as are now in use, without change; also to construct a microscope of the type having an upwardly extending arm upon the upper end of which the optical system of the instrument is mounted, and which may be provided with the usual coarse or preliminary adjusting means located adjacent thereto, and with which system a secondary or fine adjustment mechanism, disposed at the lower end of said arm may be operatively connected; and also to construct a microscope in which the foregoing results may be attained with the minimum number of parts, and at a minimum cost.

The manufacture of microscopes of modern design results in the use of larger and heavier parts, including a relatively large body tube of either monocular or binocular type, and which may carry a multiple nose piece supporting several objectives and which parts are disposed in overhanging arrangement at the upper forward end of the arm, and include one or more members slidably adjusted up and down in guides or bearings. The weight of the overhanging parts is such as to cause a tendency of said sliding parts to bind in said guides, and a further object of the invention is to provide simple and practical means for preventing such members from binding in their guides under such conditions.

Various other objects and advantages will be apparent from the following description of the invention and the novel features will be particularly pointed out in connection with the appended claims.

In the drawings:

Fig. 1 is a transverse sectional elevation, taken approximately on line 1—1 of Fig. 2, illustrating one embodiment of my invention.

Fig. 2 is a central, longitudinal vertical section thereof, taken approximately on line 2—2, Fig. 1.

Fig. 3 is a fragmentary horizontal section thereof, taken on line 3—3, Fig. 2.

Fig. 4 is a complete side elevation of the microscope shown in Figs. 1 to 3.

Fig. 5 is a longitudinal, vertical fragmentary section of a second embodiment or modified form of my invention.

The microscope shown in the drawings for illustrating my invention includes a base 10 having thereon a stage 11. Extending upwardly from the base 10 is an upright arm or post 13, to which is connected the stage 11, and which is movably connected to the base 10 by a pivotal connection or inclination joint 12. The arm 13 serves to support the optical system of the instrument, and for this purpose is provided at its upper end with a laterally extending or overhanging part 15. As shown in the drawings, the arm 13 is of hollow construction having therein a cavity 18 terminating in an upright, laterally facing opening 19 at the upper end of the arm.

The opening 19 is formed with an upright guide way or bearing 20, in which a slide 23 of an adjustable intermediate member 22 operatively engages to permit up and down movements of said member 22 relatively to the arm 13.

The intermediate member 22 is in turn provided at its outer or front side with a similar vertical guide or bearing 24 for the reception of the corresponding slide or part of an outer member 25, which, in turn, is movable up and down relatively to the intermediate member 22, and is adapted to support, in any suitable manner, the optical system of the instrument. In the construction illustrated, the optical system includes a body tube or part 28 secured to the outer member 25 and having at its upper end an eye piece tube 29 provided with the usual ocular 30. Below the body tube 28, the outer member 25 is provided with a lateral extension 31 carrying a depending mounting 32, at the lower end of which is arranged an objective 33.

Suitable means are provided for effecting relative adjustments between the outer and intermediate members 25 and 22 to enable a primary or coarse adjustment of the optical system to be effected. These means include an upright rack 35 fixed to the back of the outer member 25 and extending into a central groove 36 in the intermediate member so as to be operatively engaged by a pinion 37 fixed upon a transverse horizontal operating shaft 38 journalled in said intermediate member, and having at its outer ends the operating knobs or buttons 39. By turning the shaft 38 in one direction or other, the outer member 25, together with the optical system mounted thereon, can be quickly adjusted up and down relatively to the other parts of the instrument so as to locate the objective 33 approximately in operative relation to an object mounted upon the stage 11.

After such an adjustment has been made, it is necessary to effect a secondary or fine adjustment of the objective 33 in order to bring the specimen into exact focus. This is effected by means of a suitable fine adjustment mechanism 40, and in order to provide the necessary steadiness when manipulating the same, this adjusting mechanism is mounted in a relatively low position on the instrument, as, for example, in the lower end of the arm 13 where it is accessible for manipulation while the hands of the user are resting upon the surface on which the instrument is supported. The fine adjustment mechanism 40 includes a transverse horizontal barrel or sleeve 41 stationarily mounted in a transverse bore 42 in said arm 13 so as to extend to opposite sides thereof. A shaft 43 is disposed in axial relation in and to the sleeve 41 and is provided at its opposite ends with operating knobs 44, and has a fine screw thread 45 which operably engages in a correspondingly threaded part 46 of the sleeve 41. The shaft 43 also slidably engages in an axial bore 47 in a stationary part arranged in the opposite end of the sleeve 41.

The shaft 43 is also provided with a fixed disk or collar 48 arranged to travel in opposite directions lengthwise of the central cavity 49 of the sleeve 41 upon turning the screw shaft 43 in one direction or another.

Arranged in said hollow or cavity 18 of the arm 13 and adjacent the sleeve 41 of the fine adjusting mechanism is a lever 50 pivoted upon and depending from a stud 51 secured in the back wall of said cavity, in a manner to support the lower end of the lever 50 in engagement with the disk 48 of the screw shaft 43. Laterally of the pivot 51, the lever 50 is provided with a small roller 52.

The fine adjusting mechanism 40 is intended to operate upon the intermediate member 22 of the instrument so as to shift this member up and down in its guide 20 relatively to the arm 13 and in these movements the intermediate member carries with it the outer member 25, together with the optical system, all of these parts moving together as a unit.

To provide the necessary operative connection between said intermediate member 22 located at the upper end of the arm 13 and the fine adjustment mechanism 40 disposed at the lower end of said arm, suitable means extending from one to the other are provided.

For example, in the embodiment of the invention illustrated in Figs. 1 to 3, there is shown an inner member or tail piece 55 movable within the cavity 18 in the arm 13, and which is rigidly secured at its upper end directly to the intermediate member 22 by screws or other fastening devices 56. The lower end of the inner member or tail piece 55 is formed to rest upon the roller 52 and hold the lever 50 in engagement with the disk 48, so that upon manipulating the fine adjustment screw 45 in a direction to swing the roller 52 upwardly, the inner member 55 will cause the intermediate member 22 to move upwardly in its guide 20. By turning the fine adjustment screw 45 in the opposite direction, the weight of the parts connected to the inner member or tail piece 55 will cause these parts to move downwardly and the lower end of the member 55 to remain in contact with the roller 52. In order to prevent the possibility of separation between the lower end of the inner member 55 and the roller 52 in such downward movements of the parts, a compression coil spring 58 may be arranged in a cavity 59 in the upper end of the arm 13 so as to exert a downward pressure upon the inner member 55.

In order to avoid any tendency of the slide portion 23 of the intermediate member 22 from binding in its guide 20, which might arise from the fact that the fine adjustment is located at one side of the guide 20 and reacts indirectly on the intermediate member and attached parts, and the resulting weight of the parts and those on the overhanging outer member 25 tending to tilt such assembly, suitable anti-tilting or anti-binding means are provided which, in Fig. 2, comprises a compression coil spring or other resilient member 60 disposed in a horizontal bore in the arm 13 so that it bears against the lower end of the inner member or tail piece 55 and exerts pressure thereon in a direction substantially perpendicular to the direction of the movement of the intermediate member 22 in its guide 20. Sufficient clearance is provided between the spring 60 and the bore in which it is confined to prevent the spring from engaging the walls of the bore within the limits of movement of the member 55 as effected through the action of the fine adjusting mechanism 40.

Other means may be provided for this purpose. For example, in the embodiment of the invention shown in Fig. 5, anti-tilting means including an inner member or tail piece 601 of modified form is provided. This member 601 is likewise arranged in the cavity 18 of the arm 13 of the instrument, but which member is not rigidly secured to the intermediate member 22 as in the case of the member 55. This inner member 601 is formed to be guided up and down in suitable guides 61 in the arm 13 and is provided at its upper end with an upright transverse bearing face 62, which operatively engages a horizontal transverse roller 63 mounted in the upper end of the arm 13. Below the roller 63, the inner member or tail piece 601 is formed with an extension 64 in which is pivoted an upwardly extending knife edge bearing 65, the free end of which operatively engages in an inverted V-shaped notch 66 formed at the lower end of a rearwardly extending lug 67 on the intermediate member 22. In this way, movements of the fine adjustment mechanism 40 are transmitted through the inner member 601 to the intermediate member 22. In order to retain the knife edge bearing 65 in contact with the lug 67 during downward adjustments, a tension spring 68 connecting the lug 67 with the extension 64 may be provided.

With the invention described, it is possible to provide at a low cost, a microscope in which the parts are arranged so that the fine adjustment knob can be turned while the hand or hands used for adjustment are supported upon the table or support on which the microscope stands, and this is done by means of comparatively few changes in microscopes as heretofore built. The intermediate member 22 and outer member 25 and the parts carried thereby, as well as the coarse adjustment mechanism, are all of a construction heretofore used, so that a substantial portion of the improved microscope can be assembled from parts identical with similar parts heretofore used on earlier models of microscopes.

By constructing a microscope, such as that herein described, in which the fine adjustment is located low down near the base and accessible while the hands of the user are supported in a steady and comfortable position, the fine adjustments may be made with greater accuracy and dispatch, particularly since the adjustments are made by turning the adjusting knob about a substantially horizontal axis.

Also the arrangement illustrated and described, by which the tendency of the relatively heavy overhanging parts at the upper end of the instrument is overcome by the provision of secondary guide or bearing means at the lower end of the arm 13 remote from and in spaced lateral relation to the upper forward guide 19, provides a novel and practical means for the purpose.

I claim as my invention:

1. A microscope having an upright, hollow arm including an upper, offset part which projects materially in a forward direction beyond the lower end of said arm, an intermediate member mounted forwardly of and upon said upper, offset part and which is adjustable up and down relatively to said arm, and an outer member which, in turn, is mounted forwardly of and upon said intermediate member for supporting parts of an optical system, means for shifting one of said members relatively to the other to effect adjustments of said optical system, a tail piece disposed in the hollow of said arm with its upper end in said offset part thereof and operatively connected to said intermediate member and having its lower end extending to a point near the lower end of said arm, means for guiding said lower end of said tail piece in and relatively to said arm, and means engaging said lower end of said tail piece for shifting said tail piece and said intermediate and outer members together for like distances and in the same relative direction for effecting other adjustments of said optical system.

2. A microscope having an upright, hollow arm including an upper offset part which projects materially in a forward direction beyond the lower end of said arm, an intermediate member mounted forwardly of and upon said upper offset part by an upright slide guide connection whereby said member may be adjusted up and down relatively to said arm, an outer member which, in turn, is mounted forwardly of and upon said intermediate member by an upright slide guide connection for similar movement relatively to said intermediate member and said arm and which has means for supporting parts of an optical system, a tail piece disposed in the hollow of said arm with its upper end in the offset part thereof and operatively connected to said intermediate member and having an elongated part extending thence downwardly to the lower end of the arm and which part is formed to have an upright sliding action on a guide in said hollow arm and relative to said arm, thereby providing a second bearing for said intermediate member remote from and at one side of the upper upright slide guide therefor to counteract binding on said slide guide due to the weight of the overhanging parts carried by said intermediate member, and means engaging said tail piece for shifting the same, said intermediate and outer members together relatively to said guides and relatively to said arm to effect other adjustments of said optical system.

3. A microscope having an upright, hollow arm including an upper offset part which projects materially in a forward direction beyond the lower end of said arm, an intermediate member and an outer member operatively connected for up and down relative movement one of which is slidably mounted upon the forward upper end of said arm in a guide bearing for collective movement of said members relative to said arm in an up and down direction, an optical system mounted on said outer arm to take part in the aforementioned movements of said inner and outer members, a tail-piece including a head rigidly secured to said intermediate member within the upper, offset part of the hollow of said arm and having an extension projecting rearwardly and downwardly to the lower end of said arm, an upright slide guide for said extension in the lower part of the hollow of said arm affording with said first guide bearing parallel and spaced guide bearings acting to counteract binding due to the weight of the parts carried on said intermediate member, and adjusting means on said arm engageable with said tail piece extension adjacent said lower bearing to shift said intermediate and outer members together and provide other adjustments for said optical system.

4. A microscope having an upright, hollow arm including an upper, offset part which projects materially in a forward direction beyond the lower end of said arm, an intermediate member mounted forwardly of and upon said upper, offset part and which is adjustable up and down relatively to said arm, an outer member which, in turn, is mounted forwardly of and upon said intermediate member for supporting parts of an optical system, the mounting for said intermediate member being in the form of an upright guide bearing in said upper, offset end of said arm, means for shifting said member in said guide bearing for adjusting said intermediate and outer members and said optical system, a tail piece disposed in the hollow of said arm with its upper end in the offset part thereof and adjacent the guide bearing for said intermediate member and the lower end of said tail piece extending into the lower end of said hollow arm, an upright guide on said arm for said lower end of said tail piece, and said tail piece having a floating connection with said intermediate member for transmitting upward and downward motion to the latter in its guide bearing by corresponding movements of said tail piece, and adjusting means for shifting said tail piece, whereby further adjustments of said optical system may be effected, and binding of said intermediate member in its guide bearing due to the weight of the parts carried thereby is overcome.

HARVEY N. OTT.